US009400683B2

(12) United States Patent
Sreedharan

(10) Patent No.: US 9,400,683 B2
(45) Date of Patent: Jul. 26, 2016

(54) OPTIMIZING EXECUTION OF PROCESSES

(71) Applicant: Unmesh Sreedharan, Kottayam (IN)

(72) Inventor: Unmesh Sreedharan, Kottayam (IN)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 14/515,520

(22) Filed: Oct. 16, 2014

(65) Prior Publication Data

US 2016/0110217 A1     Apr. 21, 2016

(51) Int. Cl.
*G06F 9/44*     (2006.01)
*G06F 9/45*     (2006.01)
*G06F 9/48*     (2006.01)

(52) U.S. Cl.
CPC .............. *G06F 9/4881* (2013.01); *G06F 8/314* (2013.01); *G06F 8/45* (2013.01); *G06F 8/10* (2013.01); *G06F 8/456* (2013.01)

(58) Field of Classification Search
CPC ............. G06F 8/10; G06F 8/45; G06F 8/314; G06F 8/456; G06F 9/506
See application file for complete search history.

(56) References Cited

U.S. PATENT DOCUMENTS

| | | | |
|---|---|---|---|
| 2005/0165822 A1* | 7/2005 | Yeung et al. .................... 707/102 |
| 2007/0038987 A1* | 2/2007 | Ohara ....................... G06F 8/45 717/151 |
| 2008/0033900 A1* | 2/2008 | Zhang et al. ..................... 706/52 |
| 2009/0216863 A1* | 8/2009 | Gebhart et al. ............... 709/220 |
| 2010/0185719 A1* | 7/2010 | Howard .................... G06F 8/45 709/201 |
| 2011/0078426 A1* | 3/2011 | Stoitsev .................... G06F 8/10 712/244 |
| 2011/0088021 A1* | 4/2011 | Kruglick ................. G06F 8/443 717/149 |
| 2011/0289519 A1* | 11/2011 | Frost ...................... G06F 9/5027 719/328 |
| 2011/0314256 A1* | 12/2011 | Callahan, II .............. G06F 8/45 712/17 |
| 2011/0314444 A1* | 12/2011 | Zhang ....................... G06F 8/45 717/106 |
| 2012/0254888 A1* | 10/2012 | Kalogeropulos ....... G06F 8/452 718/107 |
| 2013/0024871 A1* | 1/2013 | Gao et al. ....................... 718/105 |
| 2013/0080339 A1* | 3/2013 | Driesen et al. ................ 705/301 |
| 2013/0086564 A1* | 4/2013 | Felch ........................ G06F 8/41 717/145 |
| 2013/0138473 A1* | 5/2013 | Balko et al. .................. 705/7.27 |
| 2014/0089530 A1* | 3/2014 | Ji .......................... G06F 3/0659 710/6 |
| 2014/0101641 A1* | 4/2014 | Staples et al. ................. 717/130 |
| 2015/0169706 A1* | 6/2015 | Sreedharan et al. .......... 718/105 |
| 2016/0110176 A1* | 4/2016 | Fink ....................... G06F 8/314 717/137 |

OTHER PUBLICATIONS

Pusukuri et al., "Thread reinforcer: Dynamically determining number of threads via OS level monitoring", IEEE, Nov. 2011, pp. 116-125;     <http://ieeexplore.ieee.org/stamp/stamp.jsp?tp=&arnumber=6114208>.*

(Continued)

*Primary Examiner* — Thuy Dao
*Assistant Examiner* — Ben C Wang

(57) ABSTRACT

Methods and system for optimizing an execution of a business process are disclosed. In one aspect, a request to execute a business process is received. The business process is executed on multiple threads, which may include multiple computations. The business process is optimized by determining an optimal number of threads for executing the business process by a thread optimization model. From the determined optimal number of threads, the computations in the threads may be distributed or reallocated iteratively by executing an inter-thread computations optimization model. Executing the thread optimization model and the inter-thread computations optimization model optimizes the execution of the business process.

17 Claims, 9 Drawing Sheets

(56) References Cited

OTHER PUBLICATIONS

Magni et al., "Automatic optimization of thread-coarsening for graphics processors", ACM, PACT'14, Aug. 2014, pp. 455-466; <http://dl.acm.org/citation.cfm?id=2628087>.*

Hlavacs et al., "Optimization for Multi-thread Data-Flow Software", Springer-Verlag Berlin Heidelberg, EPEW 2011, LNCS 6977, Oct. 2011, pp. 102-116; <http://link.springer.com/chapter/10.1007%2F978-3-642-24749-1_9#page-1>.*

* cited by examiner

OPTIMIZING EXECUTION OF PROCESSES

BACKGROUND

Advancements in the field of technology have increased the demand for systems and applications that support a diverse set of functions in an organization. Such systems and applications may include execution of complex algorithms and procedures to implement processes in the organization. The execution of algorithms and procedures to implement processes may consume dedicated computing resources and may add to the operational costs. Some of the processes may not be optimized, resulting in underutilization of the computing resources. In addition, optimizing processes such that the computing resources are effectively utilized may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques related to optimizing execution of processes are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Business processes may refer to a collection of related activities or tasks. Such activities may be structured and may be associated with a specific service or a product. A business process may include multiple sub-processes that may be executed to achieve a desired objective. The sub-processes or the business process may be executed concurrently in parallel on multiple threads.

A thread on which a business process is executed, may be a component of the business process, and may include a sequence of programmed instructions executed by a processor of a general purpose computer. Multiple threads may run or execute in parallel to execute the business process and may share computing resources such as processor, memory, etc. Determining and allocating an optimal number of threads for executing a business process may contribute to optimizing the execution of the business process. Optimizing the execution of a business process may include modifying an aspect of the process that makes it work more efficiently by using fewer computing resources. By way of example, optimizing the execution of a business process may correspond to reducing an overall time required to execute the business process, reducing the amount of memory consumed or utilized to execute the business process, etc.

Figure 1:
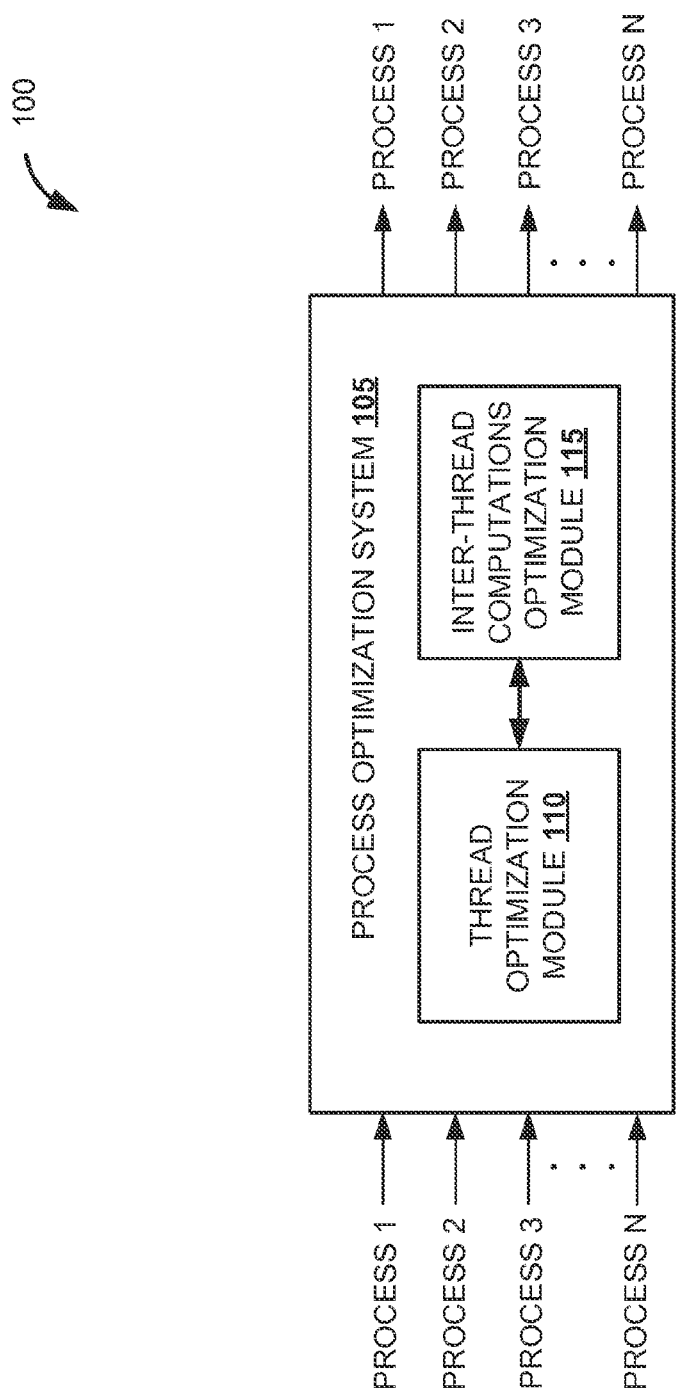
FIG. 1 is a block diagram illustrating process optimization system to optimize the execution of business processes, according to an embodiment.

FIG. 1 is a block diagram 100 illustrating process optimization system 105 to optimize the execution of business processes, according to an embodiment. By way of illustration, FIG. 1 shows process optimization system 105 that optimizes an execution of business processes (e.g., process 1, process 2, process 3, process N, etc.). The process optimization system 105 includes thread optimization module 110 and inter-thread computations optimization module 115 that may work in conjunction with each other to optimize the execution of the business processes (e.g., process 1, process 2, process 3, process N, etc.).

In an embodiment, process optimization system 105 may optimize the execution of the business process by thread optimization module 110 and inter-thread computations optimization module 115. When process optimization system 105 receives a request to execute a business process (e.g., process 1), thread optimization module 110 may determine an optimal number of threads required to execute the business process (e.g., process 1). Thread optimization module 110 may determine attributes, structure, number of computations, etc., associated with the business process (e.g., process 1). The thread optimization module 110 may iteratively calculate a total time required to execute computations associated with the business process (e.g., process 1) by incrementing number of threads (e.g., a thread count) to execute the computations in the business process (e.g., process 1). In each iteration, the thread count may be incremented, and the total time required to execute the computations in the business process (e.g., process 1) is calculated and compared with the corresponding values (e.g., total time required to execute the computations, thread count, etc.) of the previous iterations. Based on the comparison, thread optimization module 110 may determine the optimal number of threads for executing the business process (e.g., "process 1").

In an embodiment, upon determining the optimal number of threads required for executing the business process (e.g., process 1), the execution of business process may further be optimized by inter-thread computations optimization module 115. The inter-thread computations optimization module 115 may determine a time required to create or generate a thread (e.g., a first thread) from the optimal number of threads and a total time required to execute the computations in the thread (e.g., the first thread). The computations in the optimal number of threads may be partitioned into time slots such that each time slot and/or computation is equal to the time required to create the thread (e.g., the first thread).

In an embodiment, based on a determination of a total time required to execute computations in the business process (e.g., "process 1"), inter-thread computations optimization module 115 may iteratively determine available free time slots in the optimal number of threads. The computations of the last thread from the optimal number of threads may be reallocated or distributed between the available free time slots in the optimal number of threads. The reallocation or distribution of the computations may optimize the execution of the business process (e.g., "process 1") by reducing the memory utilized and the total time required executing the business process.

Figure 2:
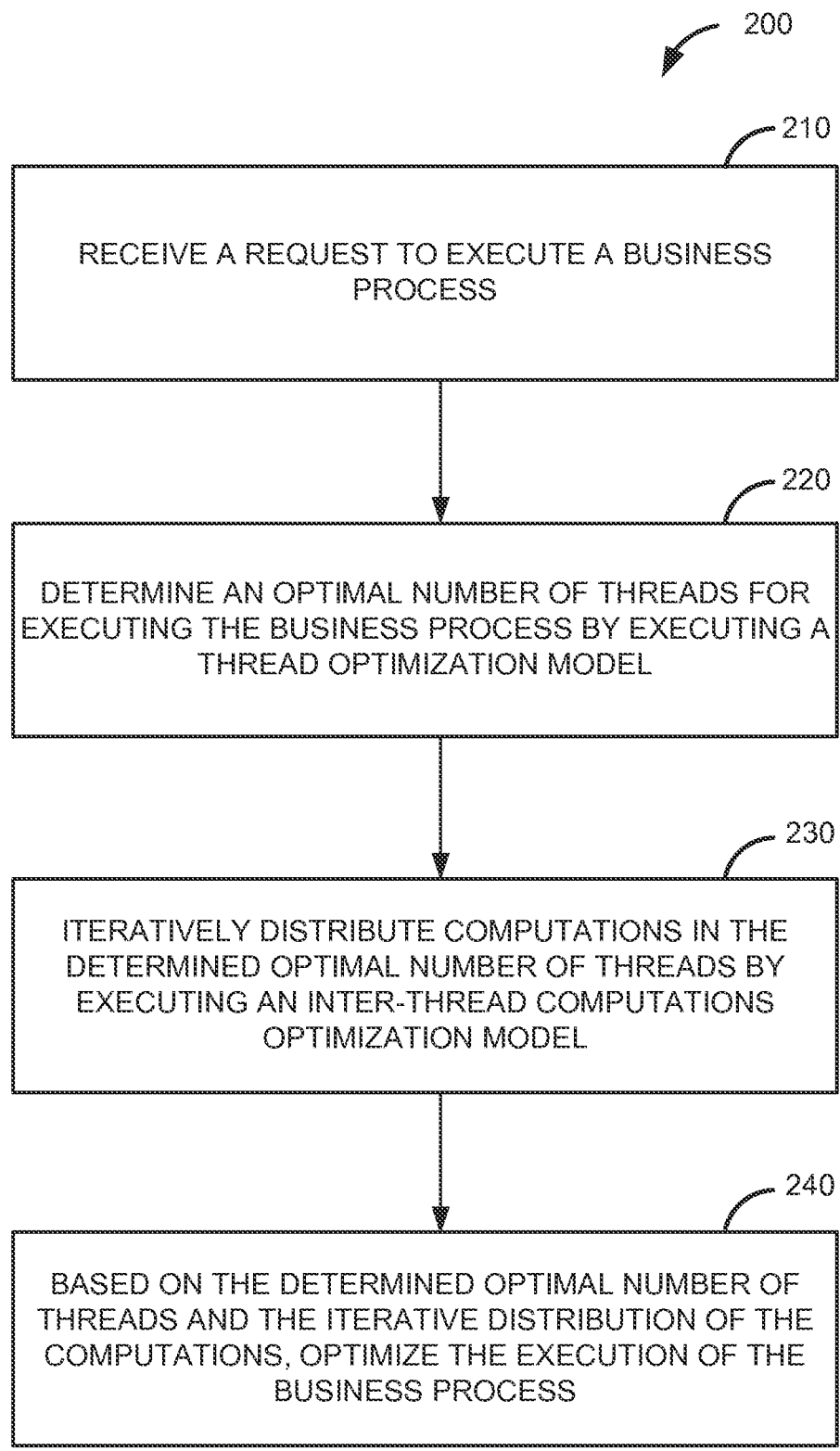
FIG. 2 is a flow diagram illustrating process to optimize an execution of a business process, according to an embodiment.

FIG. 2 is a flow diagram illustrating process 200 to optimize an execution of a business process, according to an embodiment. The process 200 may include receiving a request to execute the business process. The threads may be independent subsets of the business process and may include instructions related to computations or calculations that are associated with the business process. In an embodiment, a request is received to execute a business process, at 210. The execution of business process may be optimized by an execution of multiple optimization models. The execution of the optimization models may be sequential and the order in which the optimization models may be executed may depend on the business process or may be defined by a user.

In an embodiment, the execution of the business process may be optimized by executing a thread optimization model and an inter-thread computations optimization model. The thread optimization model may be executed to determine an optimal number of threads required for executing the process, at 220. Upon determining the optimal number of threads to execute the process, the inter-thread computations optimization model may be executed. The execution of inter-thread computations optimization model iteratively distributes computations in the determined optimal number of threads, at 230. The distribution or reallocation of the computations may be based on business logic. By way of example, the business logic may include iteratively parsing the threads to determine whether: the computations in the threads may be reallocated; the computations in the threads are awaiting reallocation, etc. Based on the determined optimal number of threads and the iterative distribution of the computations in the optimal number of threads, the execution of the business process is optimized, at 240.

Figure 3:
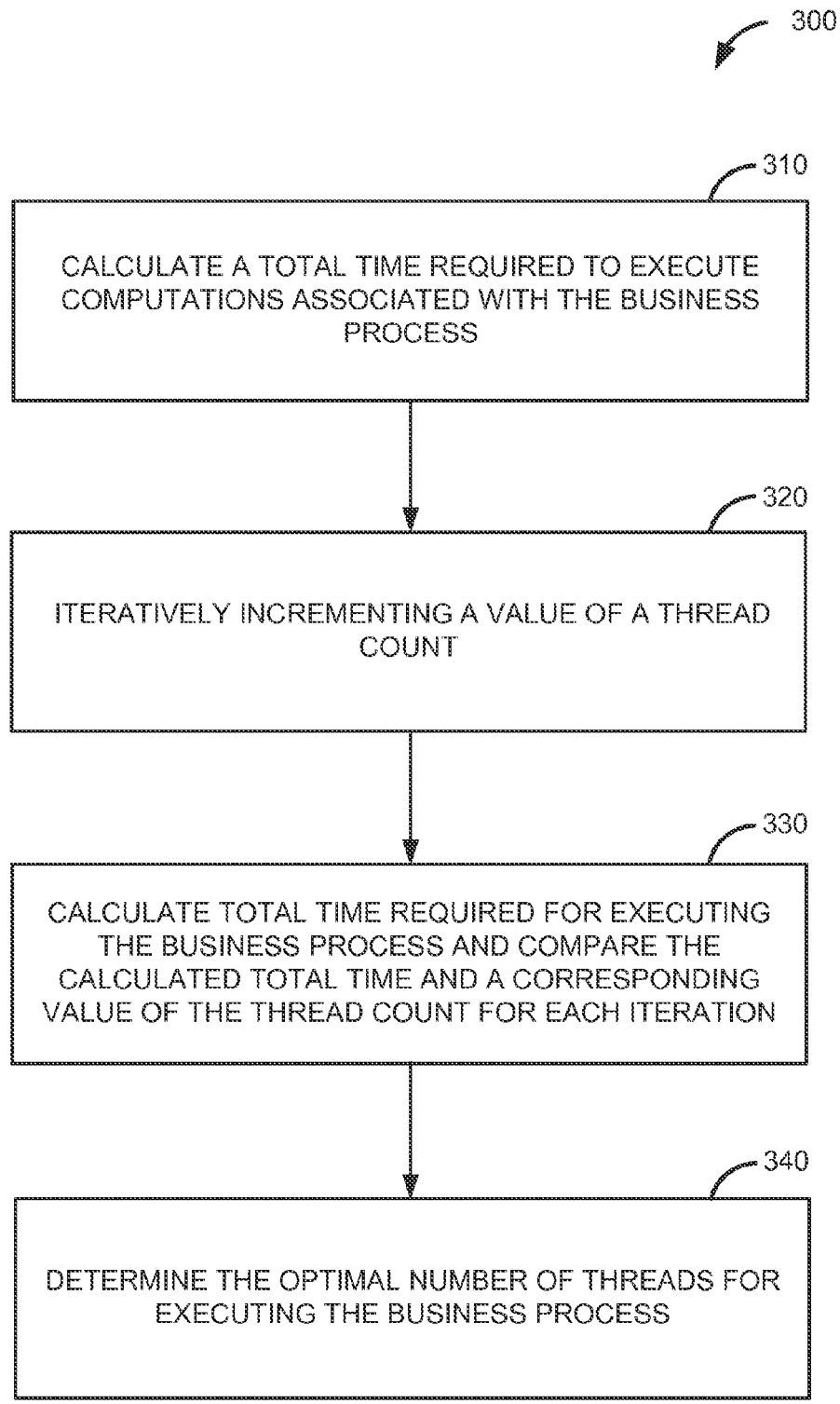
FIG. 3 is a flow diagram illustrating process to optimize an execution of a business process, according to an embodiment.

FIG. 3 is a flow diagram illustrating process 300 to optimize an execution of a business process, according to an embodiment. In an embodiment, a business process may be optimized by an execution of a thread optimization model that may determine an optimal number of threads required to execute the business process. The execution of process 300 provides a mechanism to determine an optimal number of threads required for an execution of the business process.

In an embodiment, the execution of the thread optimization model may determine the attributes, structures, number of computations, etc., associated with the business process. The determination of the optimal number of threads required for the execution of the business process may start by a value for number of threads (e.g., thread count). Based on the thread count, an overall time (e.g., total time) required to execute the computations in the threads may be determined. The total time required to execute the computations in the threads may be based on parameters, such as, number of computations in the thread, a time required or taken to create or generate the thread, time required or taken for executing computations in the thread, fixed additional processing time taken for each thread, etc. The total time required to execute the computations associated with the business process is calculated, at 310. The value of thread count is iteratively incremented, at 320. Upon incrementing the thread count, the total time taken to execute the computations for a corresponding value of the thread count may be calculated. By iteratively incrementing the thread count, the total time required to execute the computations may be reduced. For each iteration, the thread count is incremented and the total time required to execute the computations in the business process is calculated. The calculated total time and a corresponding value of the thread count are compared for each iteration, at 330 (e.g., total time required to execute the computations, thread count, etc., of each iteration is compared with the corresponding values of the previous iterations). Based on the comparison, the thread optimization module, determines the optimal number of threads for executing the business process, at 340.

In an embodiment, consider 'c' representing a time required for each computation in a thread 't', then an total time required to create a thread, may be computed using the equation:

$$T=(t*n)+(c*i)+f \qquad \text{Equation (1)}$$

In an embodiment, 'n' represents the number of threads; 'i' represents number of calculations or computations in thread 't'; and 'f' represents fixed additional processing time.

In an embodiment, when 'n' corresponds to a master thread (e.g., process is executed on a single thread) and there are no additional threads (e.g., child threads), then value of 'n' is '0' (zero). Hence Equation (1) may be rewritten as:

$$T=(c*N)+f \qquad \text{Equation (2)}$$

In an embodiment, 'N' corresponds to 'i' which represents the number of computations or calculations in the business process, in Equation (2).

By way of example, consider optimizing the execution of business process 'A'. In an embodiment, the business process 'A' may be optimized by determining an optimal number of threads required for its execution. The total time required for executing the computations may be optimized or reduced by iteratively increasing the value of thread count and calculating a corresponding total time required for the execution of the computations in the business process. In each iteration, the calculated total time required for the execution of the computations may be compared with the corresponding value of total time required for the execution of the computations in the previous iteration. The lowest value of the total time required for the execution of the computations may be determined and the corresponding value of the thread count may be determined. This determined value of the thread count may correspond to the optimal number of threads required to execute the computations, thereby optimizing the execution of the business process 'A.'

In an embodiment, consider that business process 'A' may be related to database operations. Consider that business process 'A' executes on a master thread and does not include any additional threads (e.g., child threads). Hence, the total time required to execute the computations in business process 'A' may be calculated using Equation (2) and this value may represent the maximum total time required to execute the computations in business process 'A'. The execution of the business process 'A' may be optimized by iteratively incrementing the thread count and calculating the corresponding value of the total time required for executing the computations.

By way of example, consider the number of computations, 'N', as equal to 100; the time required for each computation, 'c', as equal to 8 ms (milliseconds); and the fixed additional processing time required for each thread, 'f' as equal to 89 ms. On substituting these values in Equation (2), the maximum total time 'T' required for the execution of business process 'A' may be computed as, T=889 ms.

In an embodiment, consider that the thread count associated with the execution of the computations in business process 'A' is iteratively incremented and the number of computations in each thread gets divided based on the number of thread count. Table 1 exemplarily illustrates total time required to execute business process 'A' based on an iterative increment in the thread count and number of computations in each thread.

TABLE 1

| Index (I) | Thread Count (n) | Thread Creation Time (t ms) | Fixed Processing Time (f ms) | Number of Computations in each thread (i) | Computation Time (c ms) | Total Time (T ms) |
|---|---|---|---|---|---|---|
| I1 | 0 | 21 | 89 | 100 | 8 | 889 |
| I2 | 2 | 21 | 89 | 50 | 8 | 531 |
| I3 | 3 | 21 | 89 | 33.3 | 8 | 418.4 |
| I4 | 4 | 21 | 89 | 25 | 8 | 373 |
| I5 | 5 | 21 | 89 | 20 | 8 | 354 |
| I6 | 6 | 21 | 89 | 16.7 | 8 | 348.6 |
| I7 | 7 | 21 | 89 | 14.3 | 8 | 350.4 |
| I8 | 8 | 21 | 89 | 12.5 | 8 | 357 |
| I9 | 9 | 21 | 89 | 11.1 | 8 | 366.8 |
| I10 | 10 | 21 | 89 | 10 | 8 | 377 |

In an embodiment, the columns of Table 1 includes attributes, such as, "INDEX", "THREAD COUNT", "THREAD CREATION TIME", "FIXED PROCESSING TIME", "NUMBER OF COMPUTATIONS IN EACH THREAD", "COMPUTATION TIME", "TOTAL TIME", etc. The rows of Table 1 includes corresponding attribute values and the values in the column "TOTAL TIME" corresponds to the total time required for executing the computations in business process 'A'. Based on the attribute value of "THREAD COUNT," the attribute values of "TOTAL TIME" may be computed using Equation (1) or Equation (2). By way of example, the attribute value '0' for "THREAD COUNT" corresponds to execution of the computations of the business process 'A' on the master thread. The attribute value '2', '3', '4', etc., corresponds to execution of the computations of the business process 'A' on multiple child threads.

By way of illustration, Table 1 shows that the attribute values in "TOTAL TIME" decreases or reduces, when the attribute value of "THREAD COUNT" is iteratively incremented. Based on an iterative increment (e.g., increment in value by 1) in the attribute value of "THREAD COUNT" and the corresponding number of computations, the total time required to execute the computations in the business process 'A' may be calculated. In each iteration, the attribute value "TOTAL TIME" may be compared with its corresponding attribute value in the previous iteration. By way of example, the attribute value "TOTAL TIME" for "INDEX" 'I2' may be compared with the attribute value "TOTAL TIME" for "INDEX" 'I1' and so on.

In an embodiment, by iteratively incrementing the thread count, calculating the total time required for executing the computations, comparing the attribute values in "TOTAL TIME" for each iteration and identifying the corresponding thread count, the optimal number of threads for execution of the business process 'A' may be determined. By way of example, Table 1 shows that the attribute values in "TOTAL TIME" keeps decreasing with an increment of the thread count, that is, till the thread count reaches 6 (indicated by indices I1 to I6); upon further incrementing the thread count, the attribute value "TOTAL TIME" starts increasing (indicated by indices I7 to I10). The attribute value "TOTAL TIME" is lowest for the attribute value in "THREAD COUNT" 6 and starts increasing when the attribute value in "THREAD COUNT" is incremented. Hence, it may be determined that the optimal number of threads for executing business process 'A' is 6. In an embodiment, the optimal number of threads may correspond to a minimum total time required to execute the computations in business process 'A'. The minimum total time (e.g., lowest total time) required to execute the business process 'A' may be further reduced by execution of inter-thread optimization model, thereby optimizing the execution of business process 'A'.

Figure 4:
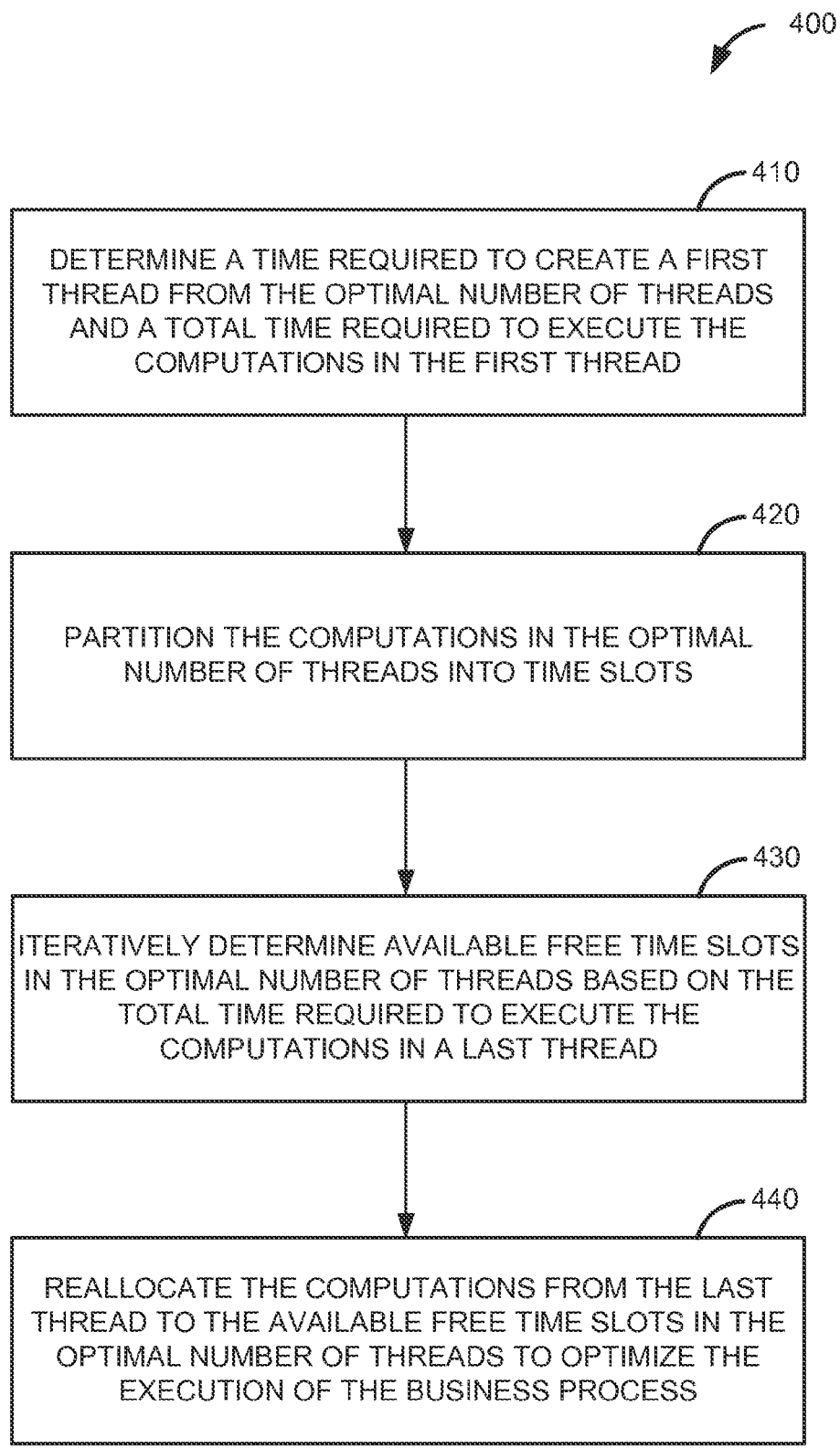
FIG. 4 is a flow diagram illustrating process to optimize an execution of a business process, according to an embodiment.

FIG. 4 is a flow diagram illustrating process 400 to optimize an execution of a business process, according to an embodiment. In an embodiment, an execution of business process may be optimized by an execution of an inter-thread computations optimization model. The inter-thread computations optimization model may iteratively distribute or reallocate computations between the optimal number of threads (e.g., determined by thread optimization model) that is associated with the business process and running concurrently in parallel. The execution of process 400 provides a mechanism to iteratively distribute or reallocate computations between the optimal number of threads executing the business process 'A'.

In an embodiment, by iteratively reallocating the computations between the determined optimal number of threads, the execution of the business process 'A' may be optimized. As explained previously, the optimal number of threads required for executing the computations of business process 'A' may be determined by thread optimization model. Each thread may be created or generated serially. The execution of business process 'A' may be further optimized by iteratively distributing or reallocating the computations between the optimal number of threads. In an embodiment, the computations in each thread from the optimal number of threads may be independent and reallocating the computations of one thread may not interrupt its own execution. The time required for executing each computation in each thread may be less than the time required for creating the thread itself. To reallocate the computations between the optimal number of threads, a time required to create a thread (e.g., a first thread) and a total time required to execute computations in the first thread is determined, at 410. Upon such determination, the computations in the first thread may be partitioned or divided into time slots. Each time slot may correspond to the time taken to create the thread.

In an embodiment, based on the time slots (e.g., partitions) created in the first thread, the computations in the optimal number of threads are partitioned into time slots, at 420. The time slot in each thread may be equal to the time taken to create the thread. In an embodiment, upon creating partitions in the optimal number of threads, a total time required to execute the computations in the last thread, may be determined. The total time required to execute the computations in the first thread, a second thread, a third thread, etc., may be less than the total time required to execute the computations in the last thread (e.g., in the optimal number of threads, the threads may be referred to as first thread, second thread, last thread, etc.).

In an embodiment, the execution of the business process 'A' is completed when the computations in the last thread is completed. In an embodiment, the execution of the computations in the first thread, second thread, etc., may be completed before the creation of the last thread (e.g., based on number of computations and time taken for execution of each computation). Since execution of the computations in the last thread completes the execution of the business process 'A', there may be free time slots available between the first thread and a second last thread. An iterative determination of such available free time slots in the optimal number of threads is made based on the total time required to execute the computations in the last thread, at 430. The availability of free time slots may be iteratively determined by parsing the threads and identify or determine the time taken to complete the execution of the computations. Upon such determination, the computations from the last thread may be reallocated to the available free time slots in the optimal number of threads to optimize the execution of business process 'A', at 440. Such reallocation may reduce the total time required to execute the computations associated with the business process 'A'.

In an embodiment, when all the computations of the last thread are iteratively reallocated between the first thread and the second last thread, the last thread may be released from business process 'A'. The mechanism to determine the available free time slots in the optimal number of threads and reallocate or distribute of the computations between the optimal number of threads may continue iteratively until the all the computations that are waiting to be reallocated are distributed between the optimal number of threads.

In an embodiment, when an availability of a free time slot is determined in higher order threads (e.g., first thread, second thread, etc.), then the computations in lower order threads (e.g., last thread, second last thread, etc.) may be iteratively distributed or reallocated between the higher order threads. Since the time taken for executing computations in the higher order threads may greater than that in the lower order threads, reallocation or distribution of the computations reduces the total time required to complete execution, thereby optimizing the execution of the business process.

Figure 5:
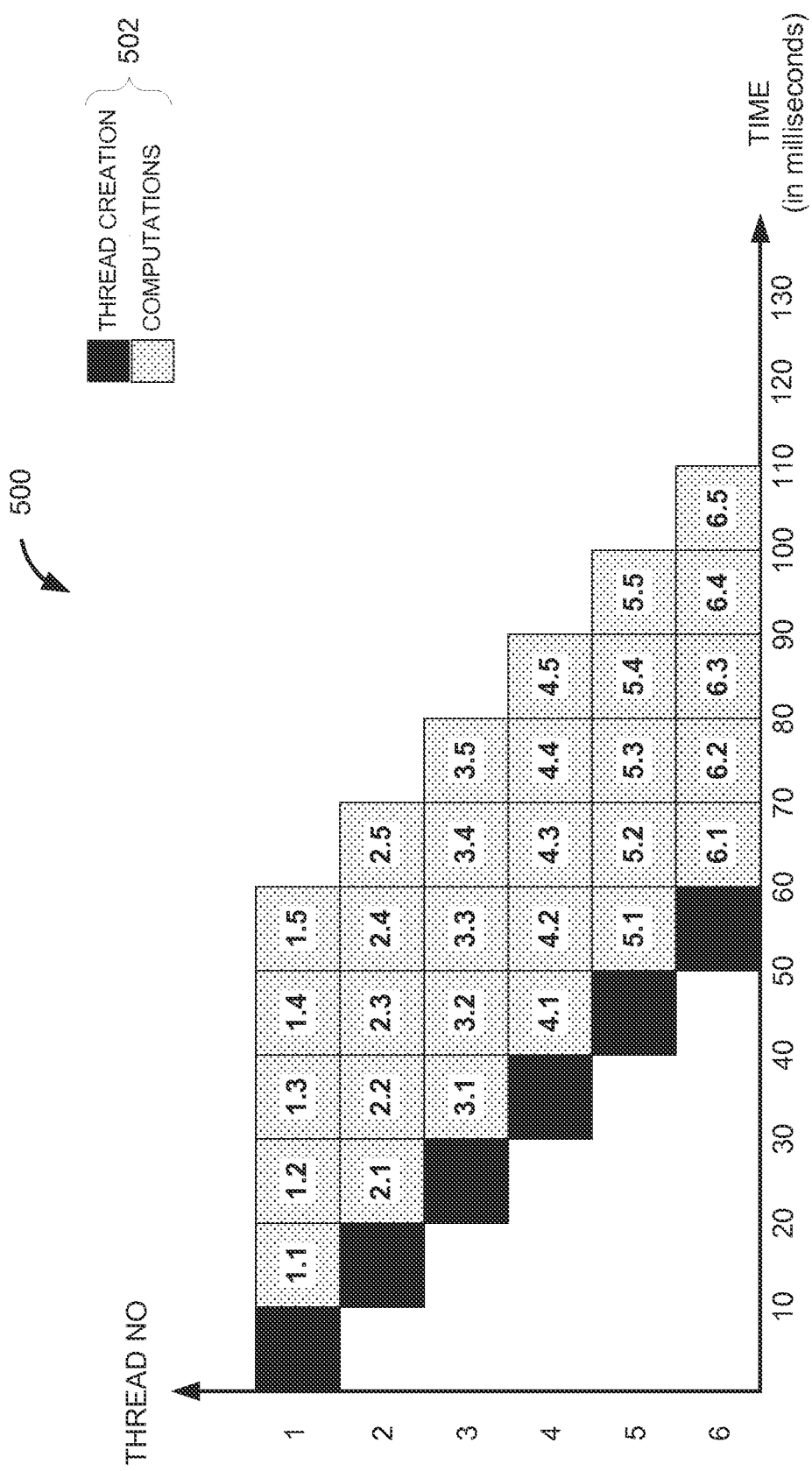
FIG. 5 is a block diagram illustrating an execution of a business process, according to an embodiment.

FIG. 5 is a block diagram 500 illustrating an execution of a business process, according to an embodiment. By way of illustration, FIG. 5 shows an execution of a business process 'A' on an optimal number of threads. As explained previously, the optimal number of threads required to execute the computations of the business process 'A' may be determined by an execution of a thread optimization model. The X-axis represents the Time (in milliseconds) and Y-axis represents the thread number (e.g., Thread No). FIG. 5 shows the execution of business process 'A' on 6 threads (e.g., representing optimal number of threads) that are created serially. By way of example, each thread may include 5 computations (e.g., computations in thread 1 are indicated by '1.1', '1.2', '1.3', '1.4', '1.5'; computations in thread 2 are indicated by '2.1', '2.2', '2.3', '2.4', '2.5', and so on). The time taken to create each thread is 10 ms and each thread may be partitioned into time slots of 10 ms, which represents the time taken for executing a computation in the thread (e.g., each time slot may correspond to the time taken to create thread, which is equal to the time taken to execute a computation in the thread). By way of illustration, FIG. 5 shows that the total time taken to complete execution of the business process is 110 ms, which corresponds to the time taken by the last thread (e.g., thread 6) to complete executing computations. The threads numbered 1, 2, 3, etc., may complete executing computations in less than 110 ms. By way of example, the time taken to complete execution of computations in each thread is approximately 60 ms (e.g., for thread numbered 1, the time taken to complete execution of computations is 0 ms to 60 ms), which includes the time taken to create the thread (represented by solid block at the beginning of the thread in FIG. 5) and the execution of the computations in the thread (represented by shaded blocks in FIG. 5). By way of illustration, the first thread (e.g., thread 1) completes execution at 60 ms; the second thread (e.g., thread 2) completes execution at 70 ms and so on. The blocks or slots that correspond to time taken to create the thread and execute the computations are indicated by legend 502.

Figure 6:
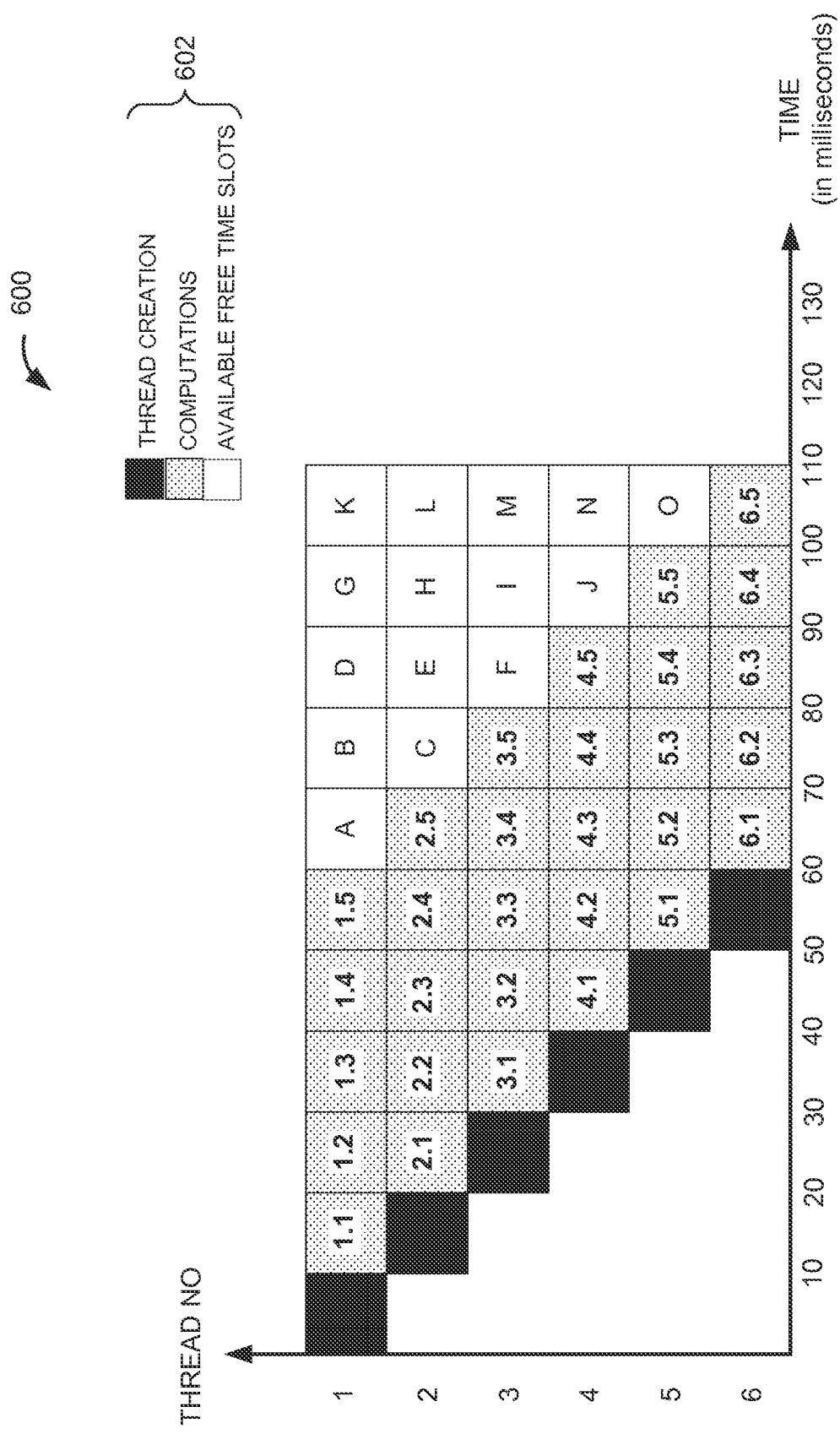
FIG. 6 is a block diagram illustrating an execution of a business process, according to an embodiment.

FIG. 6 is a block diagram 600 illustrating an execution of a business process, according to an embodiment. By way of illustration, FIG. 6 shows the execution of business process 'A' on 6 threads. The X-axis represents the Time (in milliseconds) and Y-axis represents the thread number (e.g., Thread No). As explained above, the maximum total time required to complete the execution of business process 'A' may be determined by identifying the time required for executing the computations in the last thread, which is 110 ms, as shown in FIG. 6. By way of illustration, FIG. 6 also shows that the first thread completes executing computations at 60 ms, the second thread at 70 ms, and so on. From the remaining optimal number of threads (e.g., in threads 1, 2, 3, 4, 5), the availability of free time slots may be determined. By way of example, FIG. 6 shows availability of 5 free time slots in thread 1 indicated by 'A', 'B', 'D', 'G', and 'K'; availability of 4 free time slots in thread 2 indicated by 'C', 'E', 'H', and 'L', and so on. Legend 602 in FIG. 6 shows the thread creation, which corresponds to the time taken or required to create a thread; computations, which corresponds to the time taken to execute a computation; available free time slots, which corresponds to the number of available free time slots.

In an embodiment, Table 2 exemplarily illustrates the available free time slots in the threads for execution of the business process.

TABLE 2

| Thread | Available free time slots | Indicator |
|---|---|---|
| 6 | 0 | — |
| 5 | 1 | 'O' |
| 4 | 2 | 'J', 'N' |
| 3 | 3 | 'F', 'I', 'M' |
| 2 | 4 | 'C', 'E', 'H', 'L' |
| 1 | 5 | 'A', 'B', 'D', 'G', 'K' |
| Total | 15 | |

By way of illustration, Table 2 shows the "AVAILABLE FREE TIME SLOTS", corresponding "THREAD" and "INDICATOR" information. Table 2 is generated based on available free time slots in each thread. In an embodiment, based on the time taken for executing computations in the last thread (e.g., thread 6), the availability of free time slots in the optimal number of threads may be iteratively determined. In the example above, it may be iteratively determined that there are a total of 15 free time slots available between the first thread (e.g., thread 1) and the second last thread (e.g., thread 5). Upon such determination, the computations of the last thread (e.g., thread 6) may be distributed or reallocated in the available free time slots between the first thread (e.g., thread 1) and the second last thread (e.g., thread 5) by executing inter-thread computations optimization model.

In an embodiment, the number of available free time slots is based on the optimal number of threads required for executing the computations in the business process. For instance, if 'k' is the number of optimal number of threads required for executing the computations in the business process, then the number of available free time slots may be determined by computing summation of free time slots between the first thread and (k−1) threads. In general, sum of first 'n' natural integers 'S' may be computed using the formula:

$$S = \frac{n*(n+1)}{2} \qquad \text{Equation (3)}$$

In an embodiment, if 'a' is the number of available free time slots, then substituting 'n' with (k−1) in Equation (3), yields:

$$a = \frac{k*(k-1)}{2} \qquad \text{Equation (4)}$$

Figure 7:
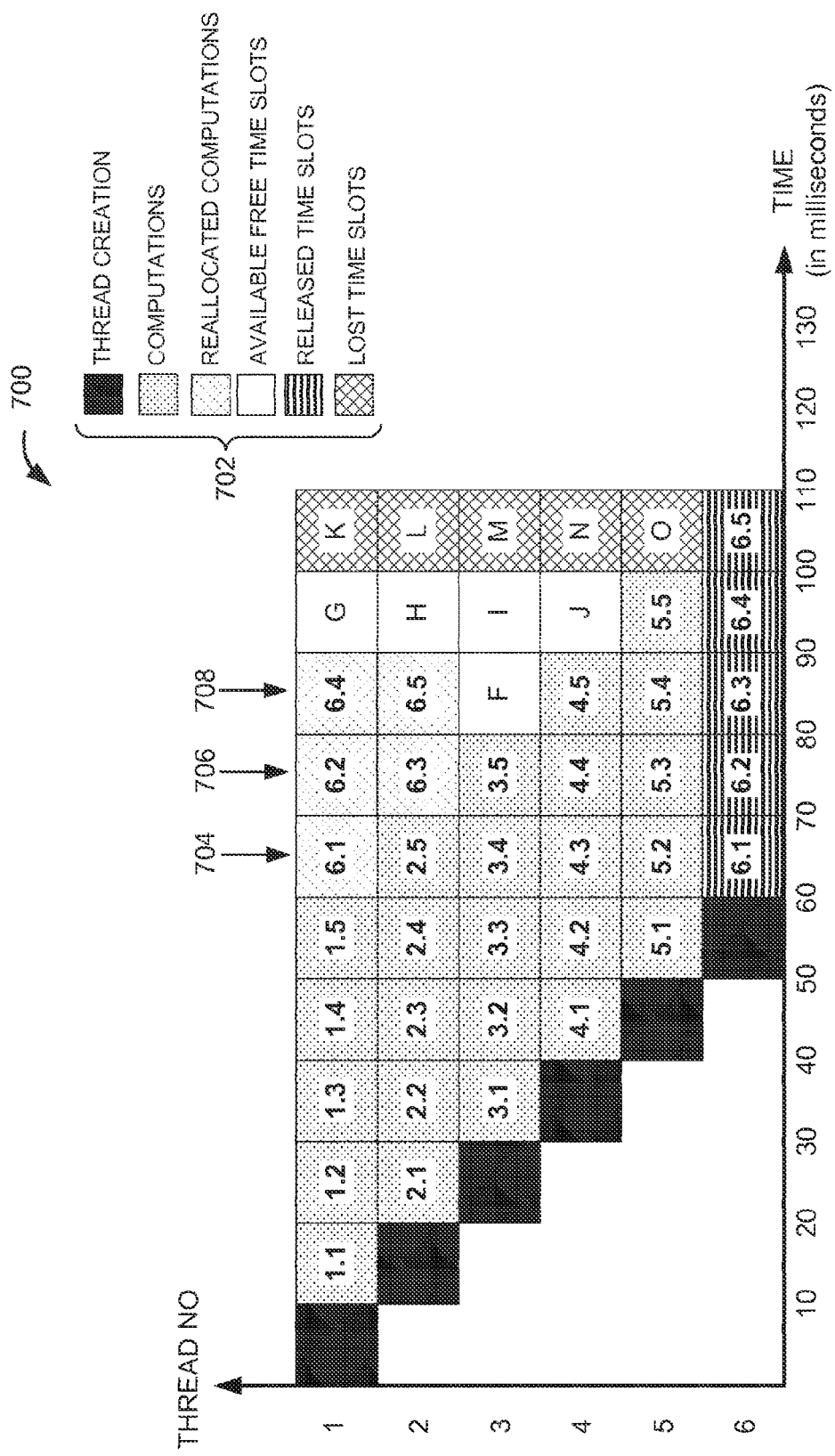
FIG. 7 is a block diagram illustrating an execution of a business process, according to an embodiment.

FIG. 7 is a block diagram 700 illustrating an execution of a business process, according to an embodiment. By way of illustration, FIG. 7 shows reallocation or distribution of computations of the last thread (e.g., thread 6) between the first thread (e.g., thread 1) and the second thread (e.g., thread 2) by an execution of inter-thread computations optimization model. The X-axis represents the Time (in milliseconds) and Y-axis represents the thread number (e.g., Thread No). By way of illustration, FIG. 7 shows that the computations of the last thread (e.g., thread 6) indicated by '6.1', '6.2', '6.3', '6.4' and '6.5' are distributed or reallocated between the available free time slots in thread 1 and the thread 2 (e.g., computation of thread 6 indicated by '6.1' gets reallocated in thread 1, at 704; computation of thread 6 indicated '6.2' gets reallocated in thread 1, at 706; computation of thread 6 indicated by '6.4' gets reallocated in thread 1, at 708; computation of thread 6 indicated by '6.3' gets reallocated in thread 2, at 706; computation of thread 6 indicated by '6.5' gets reallocated in thread 2, at 708, etc.) In an embodiment, since all the computations in thread 6 are reallocated, thread 6 may be released from participating in the execution of the business process. The reallocation of the computations from thread 6 reduces the total time required for the execution of business process to 100 ms. Hence the total time required for the execution of business process is decreased by 10 ms and the optimal number of threads is reduced by 1 thread, thereby optimizing the execution of the business process by using 5 threads.

In an embodiment, upon releasing the last thread (e.g.; thread 6) from participating in the execution of the business process, it may be determined that the total number of free time slots that are available is reduced to 10. By way of illustration, FIG. 7 shows the time slots indicated by 'K', 'L', 'M', 'N' and 'O' are lost (e.g., lost time slots) as the result of releasing thread 6, thereby reducing the number of available free time slots to 10. In an embodiment, any further reallocation of the computations may result in releasing more threads (e.g., the second last thread, thread 5) from participating in the execution of the business process. In such a scenario, the inter-thread computations optimization model may determine that reallocations or distribution of the computations in the optimal number of threads may not be possible and the mechanism to reallocate computations stops. Legend 702 in FIG. 7 shows the thread creation, which corresponds to the time taken or required to create a thread; computations, which corresponds to the time taken to execute a computation; reallocated computations, which corresponds to the computations that are reallocated; available free time slots, which corresponds to the number of available free time slots; released thread, which corresponds to the thread that is released from participation in the execution of the business process; and lost time slots, which corresponds to the time slots that are lost as the result of releasing thread.

In an embodiment, when the computations in the second last thread (e.g., thread 5) are reallocated or distributed among the remaining available free time slots (e.g., between thread 2 and thread 4, indicated by 'G', 'H', 'F', 'I' and 'J') and the second last thread (e.g., thread 5) is released from participation in the execution of business process, it may result in losing 4 more time slots (e.g., when thread 5 is released from participating in the business process, time slots indicated by 'G', 'H', 'I' and 'J' may be lost). This may result in loss of the computations in the remaining optimal number of threads (e.g., between thread 1 and thread 4). Hence the process of iteratively distributing or reallocating the computations between the optimal number of threads may be stopped.

Figure 8:
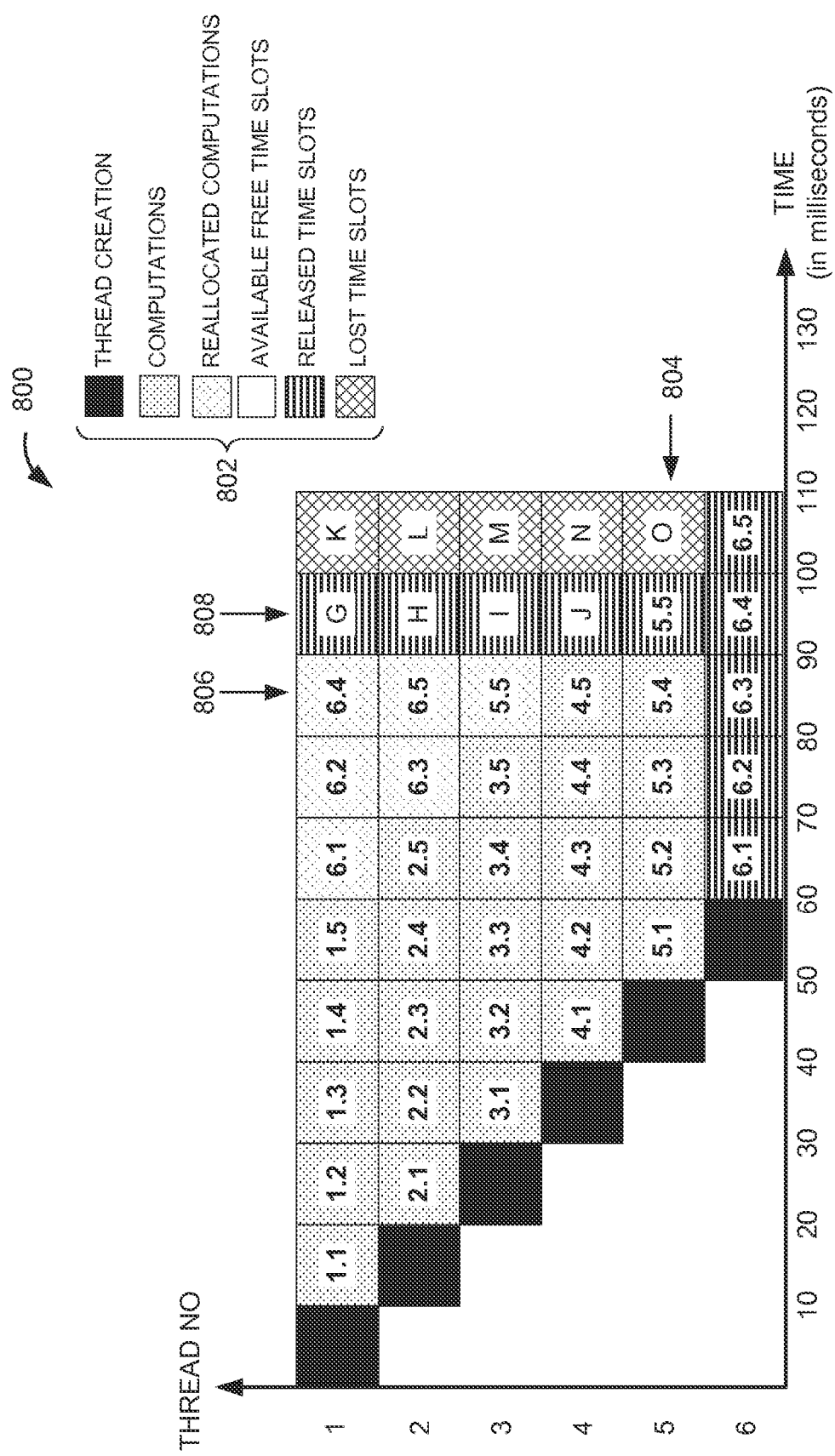
FIG. 8 is a block diagram illustrating an execution of a business process, according to an embodiment.

FIG. 8 is a block diagram 800 illustrating an execution of a business process, according to an embodiment. By way of illustration, FIG. 8 shows partial reallocation or distribution of computations in the optimal number of threads. The X-axis represents the Time (in milliseconds) and Y-axis represents the thread number (e.g., Thread No). In an embodiment, the computations of the second last thread (e.g., thread 5) indicated by '5.5' may be partially reallocated (e.g., computation of thread 5 indicated by '5.5', at 804 gets reallocated thread 3, at 806). Upon partial reallocation of the computation '5.5', the times slots at 808 indicated by 'G', 'H', 'I', 'J' and (e.g., '5.5' at 804) may be released from participating in the execution of the business process. In such a scenario, the total time required for the execution of the business process may further be reduced by 10 ms, thereby optimizing the execution of the business process. Legend 802 in FIG. 8 shows the thread creation, that corresponds to the time taken or required to create a thread; computations, that corresponds to the time taken to execute a computation; reallocated computations, that corresponds to the computations that are reallocated; available free time slots, that corresponds to the number of available free time slots; released thread, that corresponds to the thread that is released from participation in the execution of the business process; and lost time slots, that corresponds to the time slots that are lost as the result of releasing thread.

By way of example, consider a scenario that the business process is executed using static or fixed number of threads (e.g., thread count of n=1; n=2000 and n=5000). For instance, consider that number of computations in each thread, 'i' is 8; fixed additional processing time, 'f' is 89 ms and time taken to create the thread, 't' is 21 ms; and memory used by each thread is about 500 KB (kilobytes), then the total time required for the execution of business process may be computed using Equation (1) and Equation (2), as follows:

Case 1:

When number of threads, n=1, the total time required for executing the business process may be computed using Equation (2), as $$T = (1000*8) + 89$$
$$= 8.089 \, ms$$

Memory required for executing computations in 1 thread is 500 KB $$\text{Total memory required} = (500*1)$$
$$= 500 \, KB$$

Case 2:
When number of threads, n=2000, the total time required for executing the business process may be computed using Equation (1), as $$T = (2000*21) + (500*8) + 89$$
$$= 46.089 \, ms$$

Memory required for executing computations in 1 thread is 500 KB $$\text{Total memory required} = (500*2000)$$
$$= 976.56 \, MB$$

Case 3:
When number of threads, n=5000, the total time required for executing the business process may be computed using Equation (1), as $$T = (5000*21) + (200*8) + 89$$
$$= 106.689 \, seconds$$

Memory required for executing computations in 1 thread is 500 KB $$\text{Total memory required} = (500*5000)$$
$$= 2441.4 \, MB$$

By way of example, consider Table 2 exemplarily illustrating calculating total time required to execute business process using the thread optimization model, where the thread count it iteratively incremented.

TABLE 2

| Index (I) | Thread Count (n) | Thread Creation Time (t ms) | Fixed Processing Time (f ms) | Number of Computations in each thread (i) | Computation Time (c ms) | Total Time (T ms) |
|---|---|---|---|---|---|---|
| I1 | 610 | 21 | 89 | 1639.344262 | 8 | 26013.75 |
| I2 | 611 | 21 | 89 | 1636.661211 | 8 | 26013.29 |
| I3 | 612 | 21 | 89 | 1633.986928 | 8 | 26012.9 |
| I4 | 613 | 21 | 89 | 1631.32137 | 8 | 26012.57 |
| I5 | 614 | 21 | 89 | 1628.664495 | 8 | 26012.32 |
| I6 | 615 | 21 | 89 | 1626.01626 | 8 | 26012.13 |
| I7 | 616 | 21 | 89 | 1623.376623 | 8 | 26012.01 |
| I8 | 617 | 21 | 89 | 1620.745543 | 8 | 26011.96 |
| I9 | 618 | 21 | 89 | 1618.122977 | 8 | 26011.98 |
| I10 | 619 | 21 | 89 | 1615.508885 | 8 | 26012.07 |
| I11 | 620 | 21 | 89 | 1612.903226 | 8 | 26012.23 |
| I12 | 621 | 21 | 89 | 1610.305958 | 8 | 26012.45 |
| I13 | 622 | 21 | 89 | 1607.717042 | 8 | 26012.74 |
| I14 | 623 | 21 | 89 | 1605.136437 | 8 | 26013.09 |
| I15 | 624 | 21 | 89 | 1602.564103 | 8 | 26013.51 |
| I16 | 625 | 21 | 89 | 1600 | 8 | 26014 |

According to Table 2, the attribute values in "TOTAL TIME" decreases or reduces when the attribute value of "THREAD COUNT" is iteratively incremented by '1', and is based on the number of computations. The total time required to execute the computations in the business process may be calculated using Equation (1) and Equation (2). As explained previously, for each iteration, the attribute value "TOTAL TIME" may be compared with its corresponding attribute value in the previous iteration and the optimal number of threads for the execution of business process may be determined.

In an embodiment, by the execution of thread optimization model, it may be determined that the optimal number of threads for executing the business process may be determined as 617 (e.g., corresponding to lowest value of "TOTAL TIME", indicated by "INDEX" I8) and the corresponding total time for executing the computations as 26011.96 ms. For this value of thread count, the total memory required for executing computations may be computed as:

Memory required for executing computations in 1 thread is 500 KB $$\text{Total memory required} = (500*617)$$
$$= 301.27 \, MB \quad \text{(Megabytes)}$$

In an embodiment, the execution of the business process may further be optimized by executing the inter-thread computations optimization model, which iteratively distributes or reallocates the computations in the optimal number of threads. By way of example, Table 3 exemplarily illustrates execution of inter-thread computations optimization model that may iteratively reduce the thread count by iteratively reallocating or distributing the computations between the optimal number of threads required for executing the business process.

TABLE 3

| Index | Number of threads reduced | Optimal number of threads | Available free time slots | Reallocated computations | Computations awaited for Reallocation | Continue Iteration |
|---|---|---|---|---|---|---|
| I1 | 161 | 617 | 103740 | 99176 | 4564 | Yes |
| I2 | 162 | 617 | 103285 | 99792 | 3493 | Yes |
| I3 | 163 | 617 | 102831 | 100408 | 2423 | Yes |
| I4 | 164 | 617 | 102378 | 101024 | 1354 | Yes |
| I5 | 165 | 617 | 101926 | 101640 | 286 | Yes |
| I6 | 166 | 617 | 101475 | 102256 | −781 | No |

Table 3 shows columns representing attributes, such as, "INDEX", "NUMBER OF THREADS REDUCED", "OPTIMAL NUMBER OF THREADS", "AVAILABLE FREE TIME SLOTS", "REALLOCATED COMPUTATIONS", "COMPUTATIONS AWAITED FOR REALLOCATION", "CONTINUE ITERATION", etc. The attribute values of "NUMBER OF THREADS REDUCED" are iteratively incremented and the corresponding attribute values of "AVAILABLE FREE TIME SLOTS", "REALLOCATED COMPUTATIONS", and "COMPUTATIONS AWAITED FOR REALLOCATION" are determined. It may be noted that the attribute values of "COMPUTATIONS AWAITED FOR REALLOCATION" iteratively decrease in value, with an increment in the value of "NUMBER OF THREADS REDUCED" (e.g., corresponding to indices I1 to I5). Based on the value of "COMPUTATIONS AWAITED FOR REALLOCATION", the reduced thread count (e.g., "NUMBER OF THREADS REDUCED") may be determined. The iterations may be stopped, when there are no more computations left for reallocation. By way of example, Table 3 shows that value of "COMPUTATIONS AWAITED FOR REALLOCATION" becomes negative and it may be determined that the value of thread count (e.g., maximum number of threads) that may be reduced is 165 (e.g., corresponding to "INDEX" I5).

In an embodiment, upon determining a value that corresponds to the maximum number of threads that may be reduced, the thread count for executing the business process may be determined. For instance, the value of maximum number of threads that may be reduced may be subtracted from the optimal number of threads required for the execution of the business process. Therefore, the number of threads required for executing the business process may be computed to be equal to a difference between the optimal number of threads required for executing the business process and the number of threads reduced, represented by:

$$\text{(optimal number of threads for executing the business process)} - \text{(number of threads reduced)} = 617 - 165 = 442 \quad \text{Equation (5)}$$

In an embodiment, using the value of thread count obtained from Equation (5), the total time required and the memory utilized for executing the business process may be computed as follows:

When number of threads, n=442, the total time required for executing the business process may be computed using Equation (1), as $$T = (5000 * 21) + (1620.746 * 8) + 89$$
$$= 22.33698 \text{ ms}$$

Memory required for executing computations in 1 thread is 500 KB $$\text{Total memory required} = (442 * 5000)$$
$$= 215.82 \text{ MB}$$

In an embodiment, by executing the thread optimization model and inter-thread computations optimization model, the number of threads required for executing the business process may be reduced. The execution of the above models, not only optimizes the execution of the business process, but also reduces the computing resources utilized.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
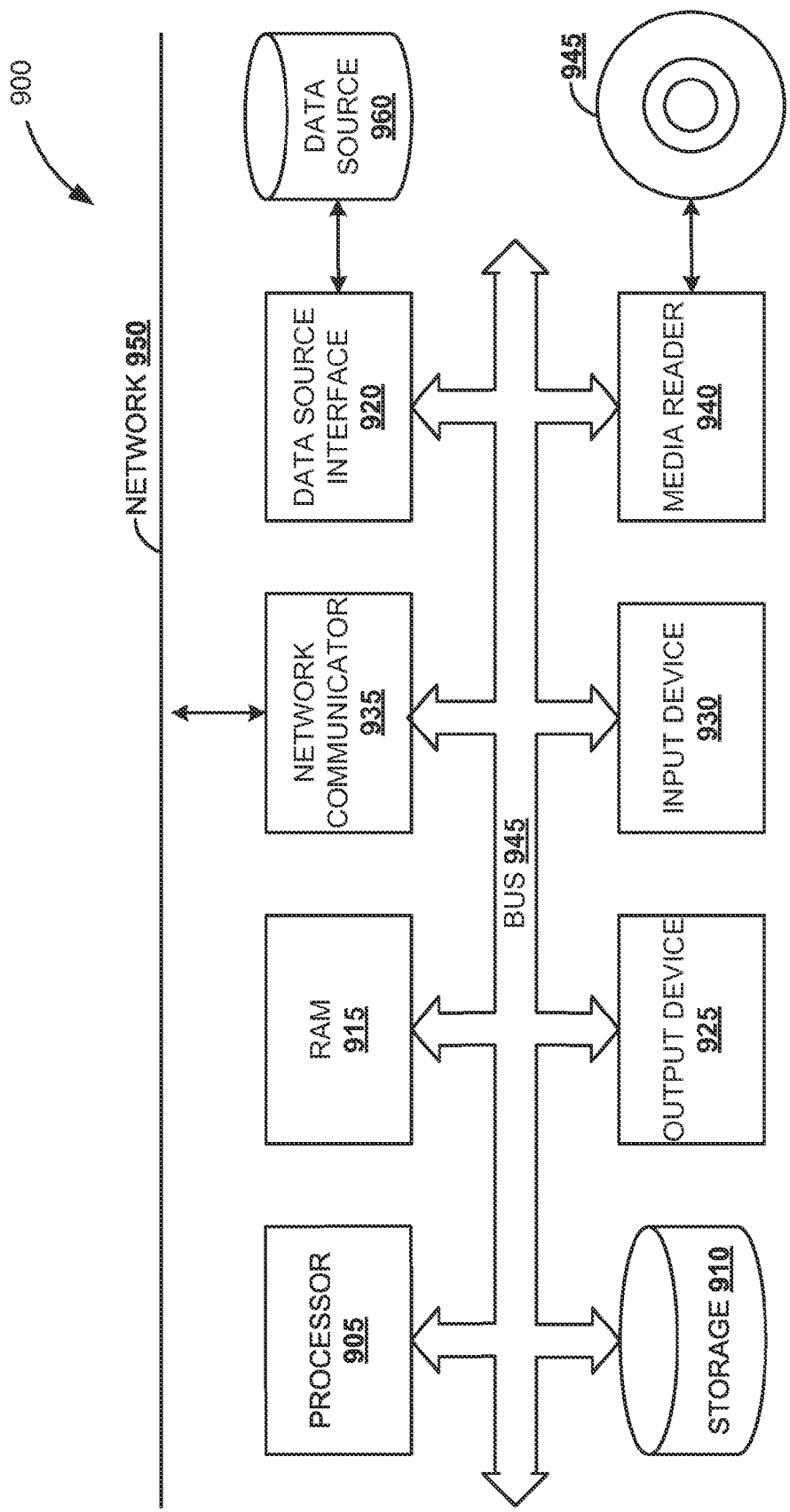
FIG. 9 is a block diagram of a computer system, according to an embodiment.

FIG. 9 is a block diagram of an exemplary computer system 900, according to an embodiment. Computer system 900 includes processor 905 that executes software instructions or code stored on computer readable storage medium 955 to perform the above-illustrated methods. Processor 905 can include a plurality of cores. Computer system 900 includes media reader 940 to read the instructions from computer readable storage medium 955 and store the instructions in storage 910 or in random access memory (RAM) 915. Storage 910 provides a large space for keeping static data where at least some instructions could be stored for later execution. According to some embodiments, such as some in-memory computing system embodiments, RAM 915 can have sufficient storage capacity to store much of the data required for processing in RAM 915 instead of in storage 910. In some embodiments, all of the data required for processing may be stored in RAM 915. The stored instructions may be further compiled to generate other representations of the instructions and dynamically stored in RAM 915. Processor 905 reads instructions from RAM 915 and performs actions as instructed. According to one embodiment, computer system 500 further includes output device 925 (e.g., a display) to provide at least some of the results of the execution as output including, but not limited to, visual information to users and input device 930 to provide a user or another device with means for entering data and/or otherwise interact with computer system 900. Each of these output devices 925 and input devices 930 could be joined by one or more additional peripherals to further expand the capabilities of computer system 900. Network communicator 935 may be provided to connect computer system 900 to network 950 and in turn to other devices connected to network 950 including other clients, servers, data stores, and interfaces, for instance. The modules of computer system 900 are interconnected via bus 945. Computer system 900 includes a data source interface 920 to access data source 960. Data source 960 can be accessed via one or more abstraction layers implemented in hardware or software. For example, data source 960 may be accessed by network 950. In some embodiments data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method to optimize an execution of a business process, comprising:
   receiving a request to execute a business process;
   upon receiving the request, determining, by a processor of the computer, an optimal number of threads for executing the business process by a thread optimization model;
   iteratively distributing, by the processor of the computer, one or more computations in the determined optimal number of threads by an inter-thread optimization model, comprising:
   determining a time required to generate a first thread from the optimal number of threads, and a total time required to execute one or more computations in the generated first thread; and
   partitioning the one or more computations in the generated first thread into one or more time slots, wherein the one or more time slots are at least equal to the time required to generate the first thread; and
   based on the determined optimal number of threads and the iterative distribution of the one or more computations, optimizing, by the processor of the computer, the execution of the business process.

2. The computer-implemented method of claim 1, wherein determining the optimal number of threads for executing the business process by the thread optimization model, comprises:
   calculating, by the processor of the computer, a total time required to execute one or more computations associated with the business process by iteratively incrementing a value of a thread count for executing the business process; and
   for each iteration, comparing, by the processor of the computer, the calculated total time and a corresponding value of the thread count to determine the optimal number of threads for executing the business process.

3. The computer-implemented method of claim 2, wherein the calculated total time corresponds to a lowest total time required for executing the one or more computations associated with the business process.

4. The computer-implemented method of claim 1, wherein iteratively distributing the one or more computations in the determined optimal number of threads by inter-thread optimization model, further comprises:
   based on a total time required to execute the one or more computations in a last thread, iteratively determining, by the processor of the computer, one or more available free time slots in the optimal number of threads; and
   reallocating, by the processor of the computer, the one or more computations from the last thread between the one or more available free time slots in the optimal number of threads, wherein the reallocation optimizes the execution of the business process.

5. The computer-implemented method of claim 1, further comprising: releasing the last thread, by the processor of the computer, from the optimal number of threads upon determining that the one or more computations corresponding to the last thread are iteratively distributed between a remaining optimal number of threads.

6. The computer-implemented method of claim 1, wherein the total time required to execute the one or more computations is based on the one or more computations in one or more threads corresponding to the determined optimal number of threads.

7. A computer system to optimize an execution of a business process, comprising:
   a processor; and
   one or more memory devices communicatively coupled with the processor and the one or more memory devices storing instructions to:
   receive a request to execute a business process;
   determine an optimal number of threads for executing the business process by a thread optimization model; and
   iteratively distribute one or more computations in the determined optimal number of threads by an inter-thread optimization model, comprising:

determining a time required to generate a first thread from the optimal number of threads, and a total time required to execute one or more computations in the generated first thread; and partitioning the one or more computations in the generated first thread into one or more time slots, wherein the one or more time slots are at least equal to the time required to generate the first thread; and based on the determined optimal number of threads and the iterative distribution of the one or more computations, optimize the execution of the business process.

8. The computer system of claim 7, wherein determining the optimal number of threads for executing the business process by the thread optimization model, comprises:

calculating a total time required to execute one or more computations associated with the business process by iteratively incrementing a value of a thread count for executing the business process; and for each iteration, comparing the calculated total time and a corresponding value of the thread count to determine the optimal number of threads for executing the business process.

9. The computer system of claim 8, wherein the calculated total time corresponds to a lowest total time required for executing the one or more computations associated with the business process.

10. The computer system of claim 7, wherein iteratively distributing the one or more computations in the determined optimal number of threads by inter-thread optimization model, comprises:

determining a time required to generate a first thread from the optimal number of threads, and a total time required to execute the one or more computations in the generated first thread; and partitioning the one or more computations in the optimal number of threads into one or more time slots, wherein the one or more time slots are equal to the time required to generate the first thread.

11. The computer system of claim 10, further comprising: releasing the last thread from the optimal number of threads upon determining that the one or more computations corresponding to the last thread are iteratively distributed between a remaining optimal number of threads.

12. The computer system of claim 7, wherein the total time required to execute the one or more computations is based on the one or more computations in one or more threads corresponding to the determined optimal number of threads.

13. A non-transitory computer readable storage medium tangibly storing instructions, which when executed by a computer, cause the computer to execute operations comprising:

receive a request to execute a business process;

determine an optimal number of threads for executing the business process by a thread optimization model; and iteratively distribute one or more computations in the determined optimal number of threads by an inter-thread optimization model, comprising:

determining a time required to generate a first thread from the optimal number of threads, and a total time required to execute one or more computations in the generated first thread; and partitioning the one or more computations in the generated first thread into one or more time slots, wherein the one or more time slots are at least equal to the time required to generate the first thread; and based on the determined optimal number of threads and the iterative distribution of the one or more computations, optimize the execution of the business process.

14. The non-transitory computer readable storage medium of claim 13, wherein determining the optimal number of threads for executing the business process by the thread optimization model, comprises:

calculate a total time required to execute one or more computations associated with the business process by iteratively incrementing a value of a thread count for executing the business process; and for each iteration, compare the calculated total time and a corresponding value of the thread count to determine the optimal number of threads for executing the business process.

15. The non-transitory computer readable storage medium of claim 14, wherein the calculated total time corresponds to a lowest total time for executing the one or more computations associated with the business process.

16. The non-transitory computer readable storage medium of claim 13, wherein iteratively distributing the one or more computations in the determined optimal number of threads by inter-thread optimization model, comprises:

determine a time required to generate a first thread from the optimal number of threads, and a total time required to execute the one or more computations in the generated first thread; and partition the one or more computations in the optimal number of threads into one or more time slots, wherein the one or more time slots are equal to the time required to generate the first thread.

17. The non-transitory computer readable storage medium of claim 16, further storing instructions, which when executed by a computer, cause the computer to execute operations comprising: release the last thread from the optimal number of threads upon determining that the one or more computations corresponding to the last thread are iteratively distributed between a remaining optimal number of threads.

* * * * *